(No Model.)
R. R. RICHARDSON.
REIN HOLDER.
No. 586,063. Patented July 6, 1897.
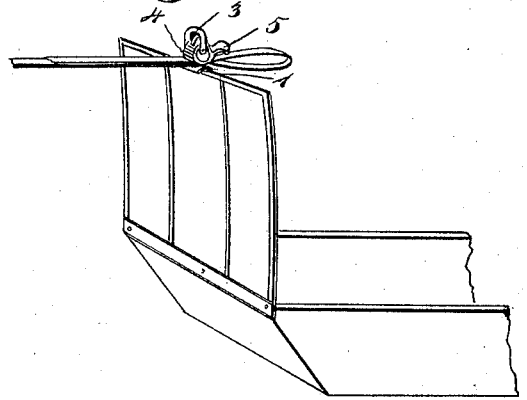
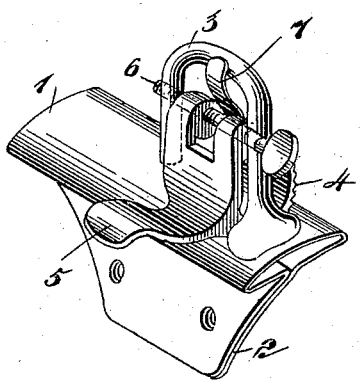
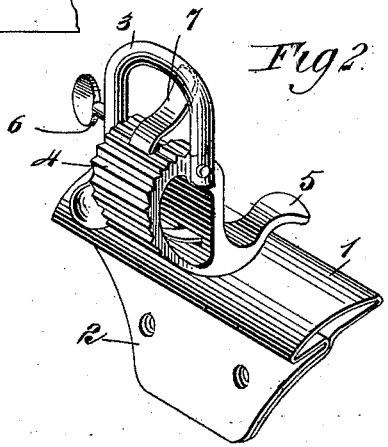
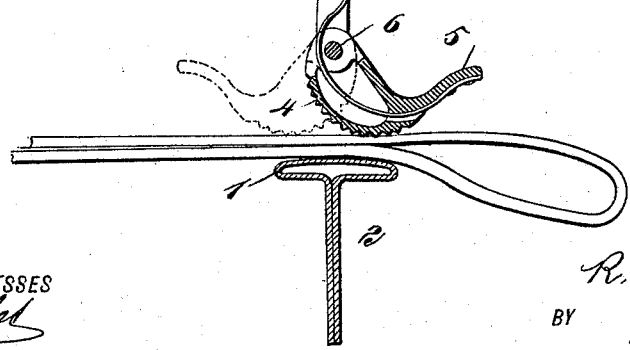
WITNESSES
INVENTOR
R. R. Richardson
BY
ATTORNEYS.

UNITED STATES PATENT OFFICE.

ROBERT R. RICHARDSON, OF PORTLAND, OREGON, ASSIGNOR OF TWO-THIRDS TO RUSSELL R. RICHARDSON AND WILLIAM H. STEMME, OF SAME PLACE.

REIN-HOLDER.

SPECIFICATION forming part of Letters Patent No. 586,063, dated July 6, 1897.

Application filed January 19, 1897. Serial No. 619,767. (No model.)

*To all whom it may concern:*

Be it known that I, ROBERT R. RICHARDSON, of Portland, in the county of Multnomah and State of Oregon, have invented a new and Improved Rein-Holder, of which the following is a full, clear, and exact description.

This invention relates to rein-holders designed to be attached to a vehicle; and the object is to provide a simple device by means of which the reins of a harness may be easily and quickly secured.

I will describe a rein-holder embodying my invention and then point out the novel features in the appended claim.

Reference is to be had to the accompanying drawings, forming a part of this specification, in which similar characters of reference indicate corresponding parts in all the views.

Figure 1 is a perspective view of a rein-holder embodying my invention and showing the same attached to the dashboard of a vehicle. Fig. 2 is a front elevation in perspective. Fig. 3 is a rear elevation in perspective, and Fig. 4 is a sectional elevation.

Referring to the drawings, 1 designates the base-plate, having a downwardly-extended tang 2, provided with holes through which rivets may pass to secure the device to the dashboard or other suitable place on a vehicle. Extended upward from the plate 1 is a supporting-yoke 3 for the holding-cam 4. The supporting-yoke is made in the form of a hook with one downwardly-extended member free from the plate 1, so that the reins may be moved laterally under the cam.

The cam 4 is provided with transverse serrations and is also provided with a finger-piece 5. A pin 6 passes through holes in the vertical members of the yoke 3, and the cam 4 is mounted to swing on this pin 6. To prevent an accidental displacement of the pin 6, I provide it with a screw-thread to engage in the tapped hole of one of the yoke members. By making the pin 6 removable it is obvious that the cam may be adjusted for inserting the reins from the right or from the left, as convenience may require.

A plate-spring 7 is extended through the cam and has one end attached to the finger-piece 5, and the other end bears on the yoke 3. This spring serves to hold the cam in yielding engagement with the reins.

It is obvious that the device may be used for other purposes than that of a rein-holder—such, for instance, as a holder for ropes, straps, whips, &c.

Having thus described my invention, I claim as new and desire to secure by Letters Patent—

A rein-holder, comprising a base-plate, a yoke on the plate and open at one side, a hollow cam mounted to swing in said yoke and having a finger-piece, and a plate-spring extended through the cam, the said spring being secured at one end to the finger-piece and bearing at the other end against the yoke, substantially as specified.

ROBERT R. RICHARDSON.

Witnesses:
H. S. LOOMIS,
WM. H. MCDONALD.